May 29, 1923.
W. LION
1,457,116
ANTISKIDDING DEVICE FOR DUAL TIRES
Filed Oct. 28, 1921
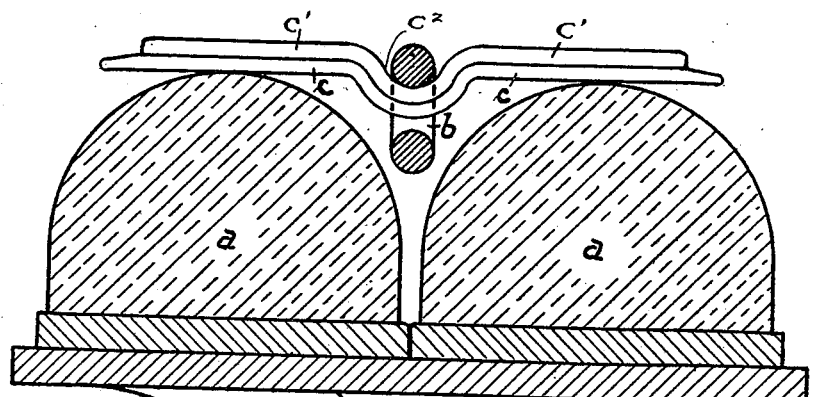
Fig. 1.
Fig. 2.
Fig. 3.
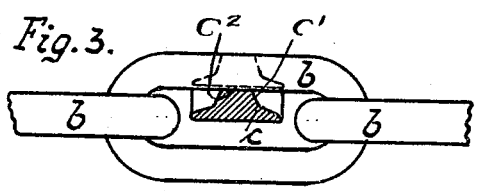
Inventor:-
Walter Lion
by attorneys Patented May 29, 1923.

1,457,116

UNITED STATES PATENT OFFICE.

WALTER LION, OF DRESDEN, GERMANY.

ANTISKIDDING DEVICE FOR DUAL TIRES.

Application filed October 28, 1921. Serial No. 511,896.

*To all whom it may concern:*

Be it known that I, WALTER LION, a subject of the Republic of Prussia, German Republic, and resident of Dresden N, have invented a new and useful Improvement in Antiskidding Devices for Dual Tires, of which the following is a specification.

This invention relates to anti-skidding devices for dual tires of hard or solid rubber, and has for its object to provide a structure formed of a chain having links into which are inserted metal treads or gripping plates.

Another object is to provide metal treads or gripping plates having grooves or notches arranged to coact with the links of the chain and be disposed in close and permanent contact with the tires by tightening the chain, which tightening also holds the treads against displacement within the links of the chain and permits a slight movement of the tread in the link and on the tires.

The construction and arrangement of the metal treads admits of easy and rapid insertion and removal, and the number of treads may be increased or reduced as desired.

Another object is to provide certain improvements in the form, construction and arrangement of the parts, whereby the above named and other objects may be effectively attained.

A practical embodiment of my invention is represented in the accompanying drawing, in which—

Fig. 1 is a vertical section through the periphery of a dual and hard rubber-tire. Fig. 2 is a plan of a separate metal tread or gripping plate inserted into a chain-link and Fig. 3 a section at a right angle to Fig. 2.

In Fig. 1 of the drawing, I have shown a chain having links denoted by $b$ located between dual elastic tires $a$ of hard or solid rubber, arranged side by side. The gripping or anti-skidding devices are each formed of a metal tread $o$ provided with a longitudinally arranged reinforcing rib $c'$ and a transverse groove or notch $c^2$ which is arranged to coact with one of the vertically disposed links $b$ of the chain. When the device is in position, the outer ends of the tread rest upon the periphery of the tires $a$ with the links of the chain disposed between the tires, in which position tension is placed upon the chain by means of tension links (not shown) and the treads held against displacement in the links of the chain and in contact with the tires. By this construction, it will be seen that the treads are free to move on the tires and in the links. It will also be seen that the outer edge of the vertical links of the chain will be brought substantially in alinement with the periphery of the tires and the outer or contact surfaces of the tread, and so assist the treads in presenting an additional resistant element to the device.

It will be understood that any number of treads may be inserted in the links of the chain, as desired.

What I claim is:

1. An anti-skidding device for dual tires having in combination a chain disposed between the tires and metal treads loosely mounted in the links and held in contact with the tires.

2. An anti-skidding device for dual tires having in combination a chain disposed between the tires and metal treads loosely mounted in the links and held in contact with the tires, said treads having grooves arranged to coact with the links of the chain.

In testimony, that I claim the foregoing as my invention, I have signed my name this 28th day of October, 1922.

WALTER LION.

Witnesses:
A. MOUS,
M. CROTBER.